United States Patent
Wood

(10) Patent No.: US 9,952,026 B2
(45) Date of Patent: Apr. 24, 2018

(54) IN-FLIGHT INSULATION GENERATION USING MATRIX-BASED HEAT SINK FOR MISSILES AND OTHER FLIGHT VEHICLES

(71) Applicant: Raytheon Company, Waltham, MA (US)

(72) Inventor: Adam C. Wood, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 624 days.

(21) Appl. No.: 14/884,515

(22) Filed: Oct. 15, 2015

(65) Prior Publication Data
US 2017/0108321 A1    Apr. 20, 2017

(51) Int. Cl.
*B64G 1/58* (2006.01)
*F42B 15/34* (2006.01)

(52) U.S. Cl.
CPC ............... *F42B 15/34* (2013.01); *B64G 1/58* (2013.01)

(58) Field of Classification Search
CPC ................................. F42B 15/34; B64G 1/58
See application file for complete search history.

(56) References Cited

U.S. PATENT DOCUMENTS

| | | | |
|---|---|---|---|
| 3,138,009 | A | 6/1964 | McCreight |
| 4,635,709 | A | 1/1987 | Altoz |
| 4,817,890 | A | 4/1989 | Coffinberry |
| 5,322,725 | A | 6/1994 | Ackerman et al. |
| 5,669,584 | A | 9/1997 | Hickey |
| 6,592,981 | B1 * | 7/2003 | Rawal ................ B64G 1/58 244/159.1 |

OTHER PUBLICATIONS

"Aerogel", Wikipedia, Oct. 14, 2015, 10 pages.

* cited by examiner

*Primary Examiner* — Brian M O'Hara

(57) ABSTRACT

A method includes absorbing heat generated at a flight vehicle using a heat sink, where the heat sink includes a matrix. The matrix includes a porous structure having multiple pores at least partially filled with one or more phase change materials. The method also includes converting the matrix into an insulator as the one or more phase change materials change state and exit the porous structure due to the absorbed heat. The matrix with the one or more phase change materials could include an alcogel, and the insulator could include an aerogel. The matrix could reside within a pressurized container that includes at least one seal. The at least one seal can fail due to increased pressure within the pressurized container as the heat is absorbed by the heat sink in order to allow the one or more phase change materials to exit the porous structure.

20 Claims, 3 Drawing Sheets

IN-FLIGHT INSULATION GENERATION USING MATRIX-BASED HEAT SINK FOR MISSILES AND OTHER FLIGHT VEHICLES

TECHNICAL FIELD

This disclosure is generally directed to thermal management techniques. More specifically, this disclosure is directed to in-flight insulation generation using a matrix-based heat sink for missiles and other flight vehicles.

BACKGROUND

Missiles, rockets, and other flight vehicles routinely accelerate to high speeds after launch. During high-speed flight, heat is created by friction of the surrounding air against the outer skin of a flight vehicle, which is often referred to as "aeroheating." The heat produced by this process can travel through the airframe of the flight vehicle and into the internal components of the flight vehicle. The amount of heat transferred to the internal components of the flight vehicle can be significant and can interfere with the proper operation of or damage the flight vehicle's components. Conventional approaches for solving this problem typically involve the use of an insulator, such as air or a solid insulator, between the outer skin and the internal components of the flight vehicle. Separate heat sinks within the flight vehicle are also often used to absorb heat from the internal components of the flight vehicle.

SUMMARY

This disclosure describes a system and method for in-flight insulation generation using a matrix-based heat sink for missiles and other flight vehicles.

In a first embodiment, a method includes absorbing heat generated at a flight vehicle using a heat sink, where the heat sink includes a matrix. The matrix includes a porous structure having multiple pores at least partially filled with one or more phase change materials. The method also includes converting the matrix into an insulator as the one or more phase change materials change state and exit the porous structure due to the absorbed heat.

In a second embodiment, an apparatus includes a heat sink configured to absorb heat. The heat sink includes a matrix. The matrix includes a porous structure having multiple pores at least partially filled with one or more phase change materials. The heat sink is configured to convert the matrix into an insulator as the one or more phase change materials change state and exit the porous structure due to the absorbed heat.

In a third embodiment, a system includes a flight vehicle and a heat sink configured to absorb heat generated at the flight vehicle. The heat sink includes a matrix. The matrix includes a porous structure having multiple pores at least partially filled with one or more phase change materials. The heat sink is configured to convert the matrix into an insulator as the one or more phase change materials change state and exit the porous structure due to the absorbed heat.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1A through 4, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1A:
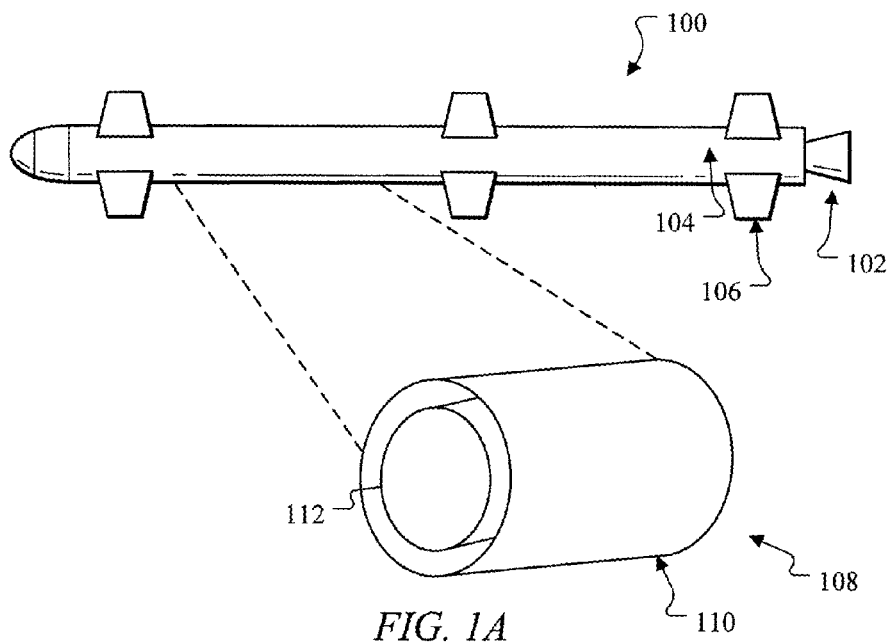
FIGS. 1A and 1B illustrate an example flight vehicle supporting in-flight insulation generation using a matrix-based heat sink in accordance with this disclosure.
Figure 1B:
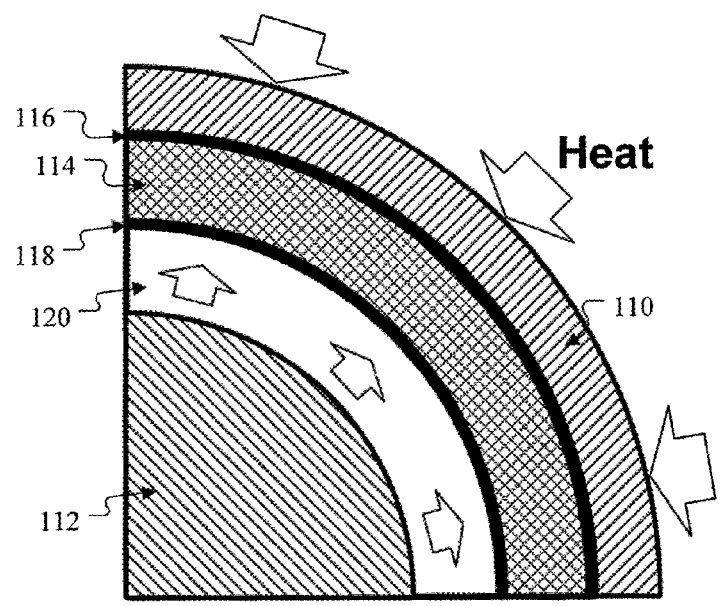

FIGS. 1A and 1B illustrate an example flight vehicle 100 supporting in-flight insulation generation using a matrix-based heat sink in accordance with this disclosure. The flight vehicle 100 here denotes a missile or rocket, although other forms of flight vehicles such as drones or hypersonic projectiles could also be used.

As shown in FIG. 1A, the flight vehicle 100 includes a motor 102 (a portion of which is visible) and a motor casing 104. The motor 102 uses fuel to generate thrust for the flight vehicle 100. The motor 102 denotes any suitable structure for generating thrust for a flight vehicle. In some embodiments, the motor 102 represents a rocket motor that operates using liquid or solid rocket fuel. The motor casing 104 encases the motor 102. The motor casing 104 is typically formed from metal or other structurally-reinforcing material(s). Fins, wings, or other structures 106 are routinely mounted on the motor casing 104 or other portions of the flight vehicle 100 to help provide stability for the flight vehicle 100 during flight.

A cut-away view 108 of a portion of the flight vehicle 100 is also shown in FIG. 1A. The cut-away view 108 shows an outer skin 110 and internal hardware 112 of the flight vehicle 100. The outer skin 110 denotes the surface that defines the exterior of the flight vehicle 100. The outer skin 110 therefore also defines the space in which other components of the flight vehicle 100 (such as the motor 102, a fuel tank, or a payload) can be positioned within the flight vehicle 100. The outer skin 110 can be formed from any suitable material(s), such as one or more metals. The outer skin 110 is typically attached to an airframe within the flight vehicle 100.

The internal hardware 112 denotes various electronic components of the flight vehicle 100. For example, the internal hardware 112 could include processing circuitry or other computing or processing devices for controlling the operation of the flight vehicle 100. The internal hardware 112 could also include a guidance system for controlling the flight path of the flight vehicle 100 or a targeting system for locating and tracking a desired target for the flight vehicle 100. Any other or additional systems or functions could be included in or performed by the internal hardware 112 depending (among other things) on the type of flight vehicle 100 used.

As noted above, during high-speed flight, heat is created by friction of the surrounding air against the outer skin 110 of the flight vehicle 100. The heat produced by this process can travel through the airframe of the flight vehicle 100 and into the internal hardware 112 or other internal components of the flight vehicle 100. This can interfere with the proper operation of or damage the flight vehicle's internal components.

In accordance with this disclosure, a matrix-based heat sink is used to generate insulation while the flight vehicle 100 is in flight. This can be done to help insulate the internal hardware 112 or other internal components of the flight vehicle 100 and/or to sink heat from the outer skin 110 of the flight vehicle 100. This mechanism is shown in greater detail in FIG. 1B, which shows one quadrant of a cross-section of the flight vehicle 100.

As shown in FIG. 1B, the matrix-based heat sink includes a matrix 114 located between two layers 116-118 of material. The matrix 114 generally represents a structure having a large number of pores or other openings within the structure. The matrix 114 could be formed from any suitable material(s), such as silica. The matrix 114 could also be formed in any suitable manner.

As described in more detail below, prior to flight, the porous structure forming the matrix 114 is partially or completely filled with one or more phase change materials, such as one or more alcohols or other liquids. During flight, the phase change material is located in the matrix 114, and heat generated against the outer skin 110 and/or by the internal hardware 112 travels into the matrix 114 and is absorbed by the phase change material. The absorbed heat causes the phase change material in the matrix 114 to change its phase, such as by vaporizing a liquid phase change material. The vaporized phase change material exits the matrix 114, removing heat from the matrix 114 and thereby removing heat from at least this portion of the flight vehicle 100. The vaporized phase change material can be vented from the flight vehicle 100 into the ambient environment, collected at another location in the flight vehicle 100, or otherwise handled. The end result of this process is that the phase change material from the matrix 114 removes heat from the matrix 114, helping to provide cooling for the outer skin 110 and/or the internal hardware 112 of the flight vehicle 100. In this way, the matrix 114 operates as a phase-change heat sink for the flight vehicle 100 for a period of time during flight.

As the phase change material is removed from the matrix 114, the remaining porous structure of the matrix 114 is often substantially filled with air.

Such a porous structure typically acts as a good insulator to prevent heat transfer from the outer skin 110 to the internal hardware 112 of the flight vehicle 100. As a result, the matrix 114 transitions from being a phase-change heat sink to acting as an insulator in the flight vehicle 100.

The layers 116-118 of material help to prevent the phase change material within the matrix 114 from escaping the matrix 114 until the flight vehicle 100 is in flight. In some embodiments, the layers 116-118 could represent portions of a pressurized container that allows the phase change material within the matrix 114 to be placed under elevated pressure and to maintain that pressure during long-term storage. The pressurized container could include one or more seals or other structures that breach, burst, or otherwise fail when the phase change material is heated so that the phase change material in a different form (such as vaporized material) can escape the pressurized container. However, the pressurization of the phase change material is not required, and other implementations could be used. For instance, the phase change material could be designed to change phase at reduced pressure, such as when venting to the ambient environment at higher altitudes. The layers 116-118 could be formed from any suitable material(s), such as one or more metals or plastics.

As a particular example of the matrix-based heat sink, the matrix 114 could initially represent an alcogel. An aerogel represents a matrix formed from silica or other material(s) with large pores filled with air, and an alcogel refers to an aerogel having pores filled with one or more alcohols. By themselves, aerogels often have densities near that of air because the aerogels have large voids or pores full of air. These aerogels can therefore serve as effective thermal insulators. Aerogels can be formed from various materials, such as silica, and are often commercially available in sheet form. Alcohols can typically absorb a large amount of heat as they evaporate, so alcohols can be used as a phase change material to remove heat from a flight vehicle.

During the production of an aerogel, an alcogel is typically heated to a relatively high temperature, such as about 300° C. This causes the alcohol in the alcogel to evaporate, thereby forming the aerogel. During this process, the heating of the alcohol in the alcogel is a cost to the normal production process, not a benefit.

In accordance with this disclosure, an alcogel can be used as the matrix 114, and the alcohol in the alcogel is heated and evaporates during flight of the flight vehicle 100. This approach therefore combines the high heat absorption characteristics associated with vaporizing an alcohol with the excellent insulation properties of an aerogel.

By using a matrix-based phase-change heat sink to generate an insulator in flight, it is possible to provide both a heat sink and an insulator for a flight vehicle 100 in a single package. This helps to reduce the size and weight of components of the flight vehicle 100, making it easier to comply with size or weight constraints placed on certain systems. Moreover, while the internal hardware 112 of the flight vehicle 100 may still require heat sinks to remove heat from the internal hardware 112 during operation, the heat sinks for the internal hardware 112 could be smaller. This helps to further reduce the size and weight of components of the flight vehicle 100. In addition, because this approach can help reduce airframe temperatures, lower-cost materials that would not normally survive typical flight temperatures could be used with the flight vehicle 100.

Note that while one matrix-based heat sink on the inside of the outer skin 110 is shown in FIGS. 1A and 1B, a flight vehicle 100 could include any number of matrix-based heat sinks placed at any suitable location(s) of the flight vehicle 100. For example, this approach could be used with various types of flight vehicles, and the number and position(s) of the matrix-based heat sink(s) can vary based on the type of flight vehicle. One example application would be with high-speed flight vehicles having prolonged (multi-minute) flight times since these types of flight vehicles routinely experience very high temperatures. In these or other types of flight vehicles, one or more matrix-based heat sinks could be placed on the internal surfaces of an airframe and/or the exterior surface of a rocket motor to keep the airframe skin or rocket motor cooler and to reduce the heat load on surrounding electronics modules or other components.

Also note that FIGS. 1A and 1B illustrate a space 120 between the internal hardware 112 and the matrix-based heat sink of the flight vehicle 100. In other embodiments, the internal hardware 112 could physically contact the matrix-based heat sink. In still other embodiments, the space 120 between the internal hardware 112 and the matrix-based heat sink could be used to house other components of the flight vehicle 100. In yet other embodiments, the matrix-based heat sink could be incorporated directly into the outer skin 110 or other portion of the flight vehicle 100, and a space may or may not exist between the outer skin 110 or other portion of the flight vehicle 100 and the internal hardware 112.

Although FIGS. 1A and 1B illustrate one example of a flight vehicle 100 supporting in-flight insulation generation using a matrix-based heat sink, various changes may be made to FIGS. 1A and 1B. For example, one or more matrix-based heat sinks could be used at any suitable location(s) of any suitable flight vehicle. Also, the relative sizes, shapes, and dimensions of the components in FIGS. 1A and 1B are for illustration only. In addition, while shown as receiving heat from both the outer skin 110 and the internal hardware 112, the matrix-based heat sink need not receive heat from both sources.

Figure 2:
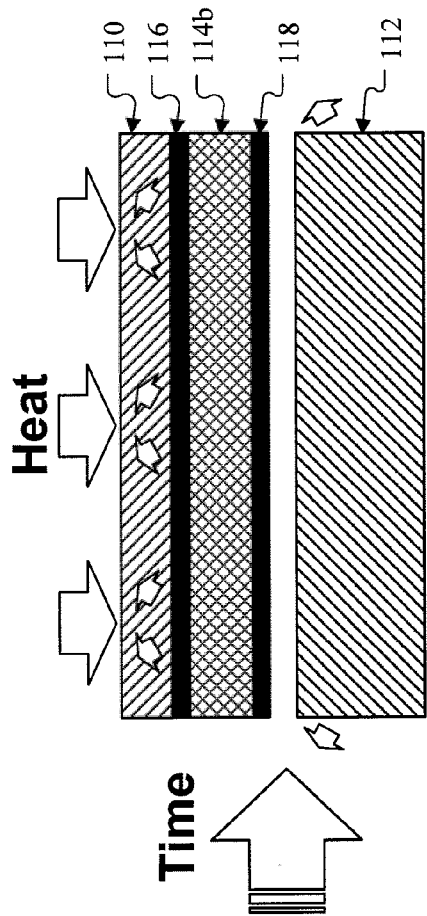
FIG. 2 illustrates an example conversion of a matrix-based heat sink into a matrix-based insulator in accordance with this disclosure.
Figure 2:
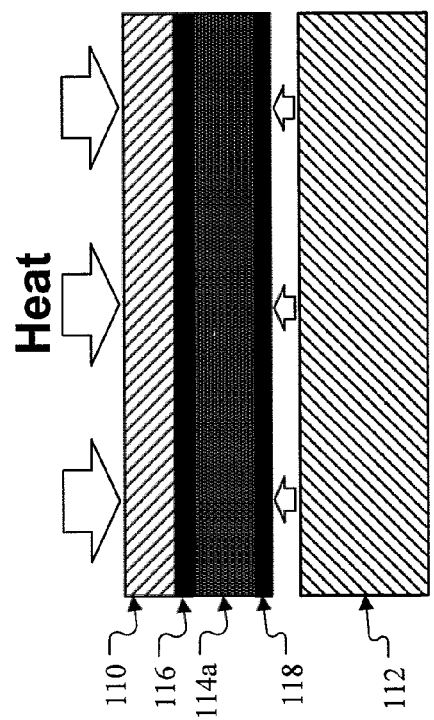

FIG. 2 illustrates an example conversion of a matrix-based heat sink into a matrix-based insulator in accordance with this disclosure. The conversion here is shown as occurring within the matrix-based heat sink used in the flight vehicle 100 of FIG. 1. However, the same or similar conversion could occur in any other suitable matrix-based heat sink used with any other suitable device or system.

As shown in FIG. 2, the matrix-based heat sink initially includes a phase change material-filled matrix 114a. The matrix 114a includes a porous structure and at least one phase change material partially or completely filling the openings of the porous structure. As noted above, the matrix 114a could be formed using, for example, a porous silica or other matrix with pores filled with one or more alcohols (an alcogel). Note, however, that the matrix 114a could be formed from any other suitable material(s), and the pores of the matrix 114a could be partially or completely filled with any suitable phase change material(s).

Heat is applied to the phase change material-filled matrix 114a during operation of the flight vehicle 100. In some embodiments, the bulk of the heat may come from the outer skin 110 of the flight vehicle 100, although at least a portion of the heat could also be received from the internal hardware 112 of the flight vehicle 100. The heat is absorbed into the heat sink primarily by the phase change material within the heat sink. The phase change material within the matrix 114a may or may not be under elevated pressure. The heat causes the phase change material to change its phase. For instance, the heat can vaporize a phase change liquid, such as alcohol in the matrix 114a. The vaporized phase change liquid or other phase change material can be removed from the matrix 114a, such as via venting from the flight vehicle 100 or to a collection region of the flight vehicle 100. This removes heat from the matrix 114a, allowing the matrix 114a to function as a heat sink for the outer skin 110 and/or the internal components 112.

Over time, part or all of the phase change material can exit the matrix 114a, resulting in the creation of an insulative matrix 114b. The insulative matrix 114b includes the porous structure of the matrix 114a, but a large portion or all of the phase change material has exited the porous structure. This creates an air-filled porous structure that functions as an effective insulator for the internal hardware 112 or other components within the flight vehicle 100. For example, the insulative matrix 114b can help to prevent the heat from the outer skin 110 from traveling through the flight vehicle 100 to the internal hardware 112. Some amount of heat from the outer skin 110 could still reach the internal hardware 112, but the amount of heat is significantly reduced and does not detrimentally affect the internal hardware 112.

As noted above, the internal hardware 112 could include its own heat sinks or other structures for cooling the internal hardware 112. Depending on the implementation, the presence of the matrix-based heat sink could allow for smaller heat sinks or other structures to be used for cooling the internal hardware 112. The heat sinks or other structures used for cooling the internal hardware 112 could represent any suitable structures and could exhaust the heat from the internal hardware 112 in any suitable manner to any suitable location(s).

Although FIG. 2 illustrates one example of a conversion of a matrix-based heat sink into a matrix-based insulator, various changes may be made to FIG. 2. For example, the relative sizes, shapes, and dimensions of the various components in FIG. 2 are for illustration only. Also, there may or may not be an empty space between the internal hardware 112 and the matrix-based heat sink. In addition, while shown as receiving heat from both the outer skin 110 and the internal hardware 112, the matrix-based heat sink need not receive heat from both sources.

Figure 3:
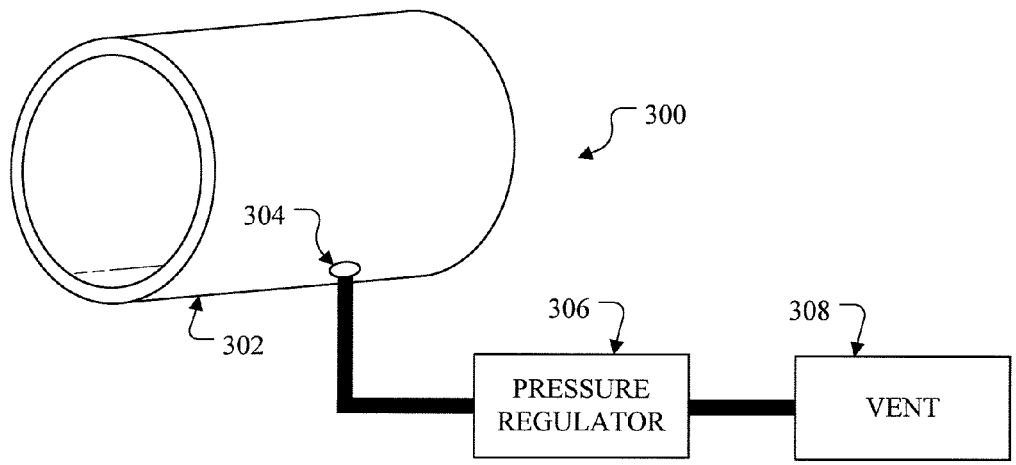
FIG. 3 illustrates example details of a specific implementation of a matrix-based heat sink supporting in-flight insulation generation in accordance with this disclosure.

FIG. 3 illustrates example details of a specific implementation of a matrix-based heat sink 300 supporting in-flight insulation generation in accordance with this disclosure. As shown in FIG. 3, the matrix-based heat sink 300 is implemented using a pressurized container 302. The pressurized container 302 in this example is generally tubular in shape, although other designs could also be used. The inner and outer surfaces of the pressurized container 302 could denote the layers 116-118 shown in FIGS. 1A through 2 described above. A porous structure representing a matrix and at least one phase change material are formed or placed within the pressurized container 302 to form the phase change material-filled matrix 114a. For example, the phase change material-filled matrix 114a could denote an alcogel.

The pressurized container 302 includes at least one seal 304. During storage, the pressurized container 302 can contain the phase change material in the matrix 114a under pressure, and the seal 304 remains intact. During flight, the phase change material in the matrix 114a heats up, which further increases the pressure within the pressurized container 302. Eventually, the seal 304 breaches, bursts, or otherwise fails, allowing heated phase change material (such as vaporized phase change material) to exit the pressurized container 302. Each seal 304 could be formed from any suitable material(s) and in any suitable manner. Also, any number of seals could be placed at any suitable location(s) of the pressurized container 302.

A pressure regulator 306 is fluidly coupled to the pressurized container 302. When the seal 304 fails, vaporized or other phase change material travels from the pressurized container 302 to the pressure regulator 306. The pressure regulator 306 allows the phase change material to escape through at least one vent 308 slowly, thereby helping to maintain the elevated pressure within the pressurized container 302. The pressure regulator 306 includes any suitable structure for maintaining pressure within a pressurized container while allowing phase change material to pass. Each vent 308 includes any suitable structure allowing passage of phase change material. Any number of vents 308 could be placed at any suitable location(s) of the flight vehicle 100.

As the phase change material in the pressurized container 302 escapes, the matrix 114a is converted from a heat sink to an insulative matrix 114b, such as an aerogel. At this point, the insulative matrix 114b within the pressurized container 302 helps to reduce the amount of heat from the outer skin 110 reaching the internal hardware 112 of the flight vehicle 100.

Although FIG. 3 illustrates example details of one specific implementation of a matrix-based heat sink 300 supporting in-flight insulation generation, various changes may be made to FIG. 3. For example, each component could have any suitable size, shape, and dimensions. Also, as noted above, the use of a vent 308 is not required, such as when vaporized phase change material is collected within the flight vehicle 100. In addition, the pressurization of the phase change material is not required, such as when the phase change material can change phase at reduced pressure (such as at higher altitudes).

Figure 4:
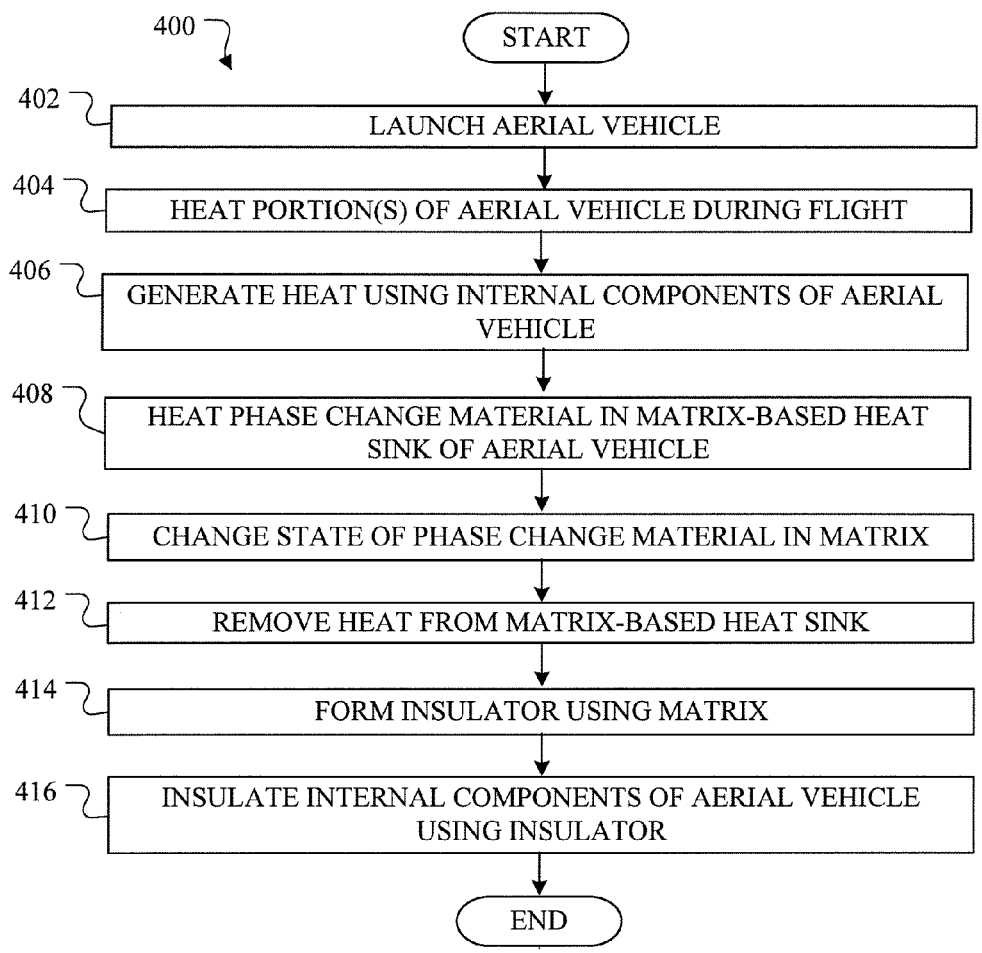
FIG. 4 illustrates an example method for in-flight insulation generation using a matrix-based heat sink for missiles and other flight vehicles in accordance with this disclosure.

FIG. 4 illustrates an example method 400 for in-flight insulation generation using a matrix-based heat sink for missiles and other flight vehicles in accordance with this disclosure. For ease of explanation, the method 400 is described with respect to the flight vehicle 100 of FIG. 1. However, the method 400 could be used with any other suitable flight vehicle or other device or system.

As shown in FIG. 4, an aerial vehicle is launched at step 402. This could include, for example, the motor 102 of the flight vehicle 100 generating thrust for the flight vehicle 100, causing the flight vehicle 100 to obtain a high speed. One or more portions of the aerial vehicle are heated during the flight at step 404, and heat is generated by one or more internal components of the aerial vehicle at step 406. This could include, for example, the outer skin 110 of the flight vehicle 100 heating up due to aeroheating. This could also include the internal hardware 112 of the flight vehicle 100 generating heat as processing or other operations occur during the flight.

At least one phase change material in a matrix-based heat sink is heated at step 408. This could include, for example, the phase change material in the matrix 114a of the matrix-based heat sink receiving the heat from the outer skin 110 and/or the internal hardware 112 of the flight vehicle. The matrix 114a at this point could denote an alcogel. The received heat causes at least a portion of the phase change material in the matrix-based heat sink to change state at step 410. This could include, for example, the phase change material in the matrix 114a of the matrix-based heat sink evaporating to produce vaporized phase change material. Heat is removed from the matrix-based heat sink at step 412. This could include, for example, the vaporized phase change material or other phase change material exiting the matrix-based heat sink. As a particular example, this could include the seal 304 of the matrix-based heat sink 300 failing as pressure within the pressurized container 302 increases and the pressure regulator 306 allowing the vaporized or other phase change material to pass to the vent 308.

The matrix-based heat sink eventually forms an insulator at step 414. This could include, for example, a substantial portion or all of the phase change material in the matrix 114a exiting the matrix 114a, thereby creating the insulative matrix 114b. The matrix 114b at this point could denote an aerogel. One or more internal components of the aerial vehicle are insulated using the insulator at step 416. This could include, for example, the insulative matrix 114b functioning to reduce the flow of heat from the outer skin 110 of the flight vehicle 100 to the internal hardware 112 or other components of the flight vehicle 100.

Although FIG. 4 illustrates one example of a method 400 for in-flight insulation generation using a matrix-based heat sink for missiles and other flight vehicles, various changes may be made to FIG. 4. For example, while shown as a series of steps, various steps in FIG. 4 could overlap, occur in parallel, occur in a different order, or occur any number of times. Also, while shown as receiving heat from both the outer skin 110 and the internal hardware 112, the matrix-based heat sink need not receive heat from both sources. In addition, the insulative matrix need not insulate electronic components within a flight vehicle. The insulative matrix could be used to insulate other components within a flight vehicle, or the matrix-based heat sink could primarily be used for its heat sinking properties without the need for its insulative properties.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. §112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. §112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    absorbing heat generated at a flight vehicle using a heat sink, the heat sink comprising a matrix that includes a porous structure having multiple pores at least partially filled with one or more phase change materials; and
    converting the matrix into an insulator as the one or more phase change materials change state and exit the porous structure due to the absorbed heat;
    wherein the insulator comprises an aerogel.

2. The method of claim 1, wherein the matrix that includes the porous structure having the multiple pores at least partially filled with the one or more phase change materials comprises an alcogel.

3. The method of claim 2, wherein:
the matrix comprises silica; and
the one or more phase change materials comprise one or more alcohols.

4. The method of claim 1, wherein:
the matrix resides within a pressurized container;
the pressurized container comprises at least one seal; and
the at least one seal fails due to increased pressure within the pressurized container as the heat is absorbed by the heat sink in order to allow the one or more phase change materials to exit the porous structure.

5. The method of claim 4, further comprising:
after the at least one seal fails, maintaining an elevated pressure within the pressurized container using a pressure regulator.

6. The method of claim 1, further comprising:
venting the one or more phase change materials after the one or more phase change materials exit the porous structure.

7. An apparatus comprising:
a heat sink configured to absorb heat, the heat sink comprising a matrix that includes a porous structure having multiple pores at least partially filled with one or more phase change materials;
wherein the heat sink is configured to convert the matrix into an insulator that comprises an aerogel as the one or more phase change materials change state and exit the porous structure due to the absorbed heat.

8. The apparatus of claim 7, wherein the matrix that includes the porous structure having the multiple pores at least partially filled with the one or more phase change materials comprises an alcogel.

9. The apparatus of claim 8, wherein:
the matrix comprises silica; and
the one or more phase change materials comprise one or more alcohols.

10. The apparatus of claim 7, wherein:
the matrix resides within a pressurized container;
the pressurized container comprises at least one seal; and
the at least one seal is configured to fail due to increased pressure within the pressurized container as the heat is absorbed by the heat sink in order to allow the one or more phase change materials to exit the porous structure.

11. The apparatus of claim 10, further comprising:
a pressure regulator configured to maintain an elevated pressure within the pressurized container after the at least one seal fails.

12. The apparatus of claim 7, further comprising:
at least one vent configured to allow escape of the one or more phase change materials after the one or more phase change materials exit the porous structure.

13. The apparatus of claim 7, wherein the heat sink when absorbing the heat is configured to cool at least one of:
an outer skin of a flight vehicle; and
a motor of the flight vehicle.

14. The apparatus of claim 13, wherein the heat sink after converting the matrix into the insulator is configured to insulate one or more internal components of the flight vehicle.

15. A system comprising:
a flight vehicle; and
a heat sink configured to absorb heat generated at the flight vehicle, the heat sink comprising a matrix that includes a porous structure having multiple pores at least partially filled with one or more phase change materials;
wherein the heat sink is configured to convert the matrix into an insulator that comprises an aerogel as the one or more phase change materials change state and exit the porous structure due to the absorbed heat.

16. The system of claim 15, wherein the matrix that includes the porous structure having the multiple pores at least partially filled with the one or more phase change materials comprises an alcogel.

17. The system of claim 16, wherein:
the matrix comprises silica; and
the one or more phase change materials comprise one or more alcohols.

18. The system of claim 15, wherein:
the matrix resides within a pressurized container;
the pressurized container comprises at least one seal; and
the at least one seal is configured to fail due to increased pressure within the pressurized container as the heat is absorbed by the heat sink in order to allow the one or more phase change materials to exit the porous structure.

19. The system of claim 15, wherein:
the flight vehicle comprises one or more internal components; and
the heat sink after converting the matrix into the insulator is configured to insulate the one or more internal components.

20. The system of claim 15, wherein:
the flight vehicle comprises a missile or rocket; and
the heat sink is one of: (i) positioned under an outer skin of the missile or rocket or (ii) positioned on an exterior surface of a motor of the missile or rocket.

* * * * *